(12) United States Patent
Rolph

(10) Patent No.: US 8,756,747 B2
(45) Date of Patent: Jun. 24, 2014

(54) TWIN BLADED SCRAPER TOOL

(76) Inventor: Ian Douglas Rolph, Durham (GB)

( * ) Notice: Subject to any disclaimer, the term of this patent is extended or adjusted under 35 U.S.C. 154(b) by 0 days.

(21) Appl. No.: 13/810,168

(22) PCT Filed: Aug. 9, 2011

(86) PCT No.: PCT/GB2011/001188
§ 371 (c)(1),
(2), (4) Date: Jan. 14, 2013

(87) PCT Pub. No.: WO2012/020216
PCT Pub. Date: Feb. 16, 2012

(65) Prior Publication Data
US 2013/0111687 A1   May 9, 2013

(30) Foreign Application Priority Data

Aug. 9, 2010 (GB) .................................. 1013348.6
Apr. 16, 2011 (GB) .................................. 1106523.2

(51) Int. Cl.
*A47L 13/02* (2006.01)
(52) U.S. Cl.
USPC .......... 15/236.02; 15/236.08; 30/172; D32/46
(58) Field of Classification Search
USPC .............. 15/236.01, 236.02, 236.05, 236.06, 15/236.08, 236.09; 30/169, 172; D32/46–49
See application file for complete search history.

(56) References Cited

U.S. PATENT DOCUMENTS

| | | | |
|---|---|---|---|
| D224,603 S * | 8/1972 | Wetzel | D32/46 |
| 4,979,302 A | 12/1990 | Magnasco | |
| 5,263,222 A | 11/1993 | Johnstone | |
| 5,822,825 A * | 10/1998 | West | 15/236.02 |
| D517,327 S * | 3/2006 | Robinson | D4/199 |
| 2006/0200932 A1 | 9/2006 | Byrnes | |
| 2008/0034525 A1 * | 2/2008 | Panfili et al. | 15/236.01 |

FOREIGN PATENT DOCUMENTS

| | | |
|---|---|---|
| DE | 298 22 119 U1 | 2/1999 |
| DE | 202 04 289 U1 | 7/2002 |
| FR | 2650171 * | 2/1991 |

OTHER PUBLICATIONS

International Search Report, Dec. 20, 2011, from International Phase of the instant application.

* cited by examiner

*Primary Examiner* — Mark Spisich
(74) *Attorney, Agent, or Firm* — Miltons IP/p.i.

(57) ABSTRACT

A scraper tool of a one piece construction is conformable for use in scraping various surfaces and is made up of a pair of scraper blades (13,13') with their junction along the length of the tool, under its handle (12). The blades extend in opposite directions under the handle (12), in line with it, at a set angle forming an open bottom, with the handle (12) above the blades (13,13') and the surface to be scraped. The application of force and direction of travel will allow the forward blade to "cut" substrates from a surface, the rear blade will maintain a cutting angle for the forward blade, the device will operate in a similar fashion on its reverse stroke.

1 Claim, 2 Drawing Sheets

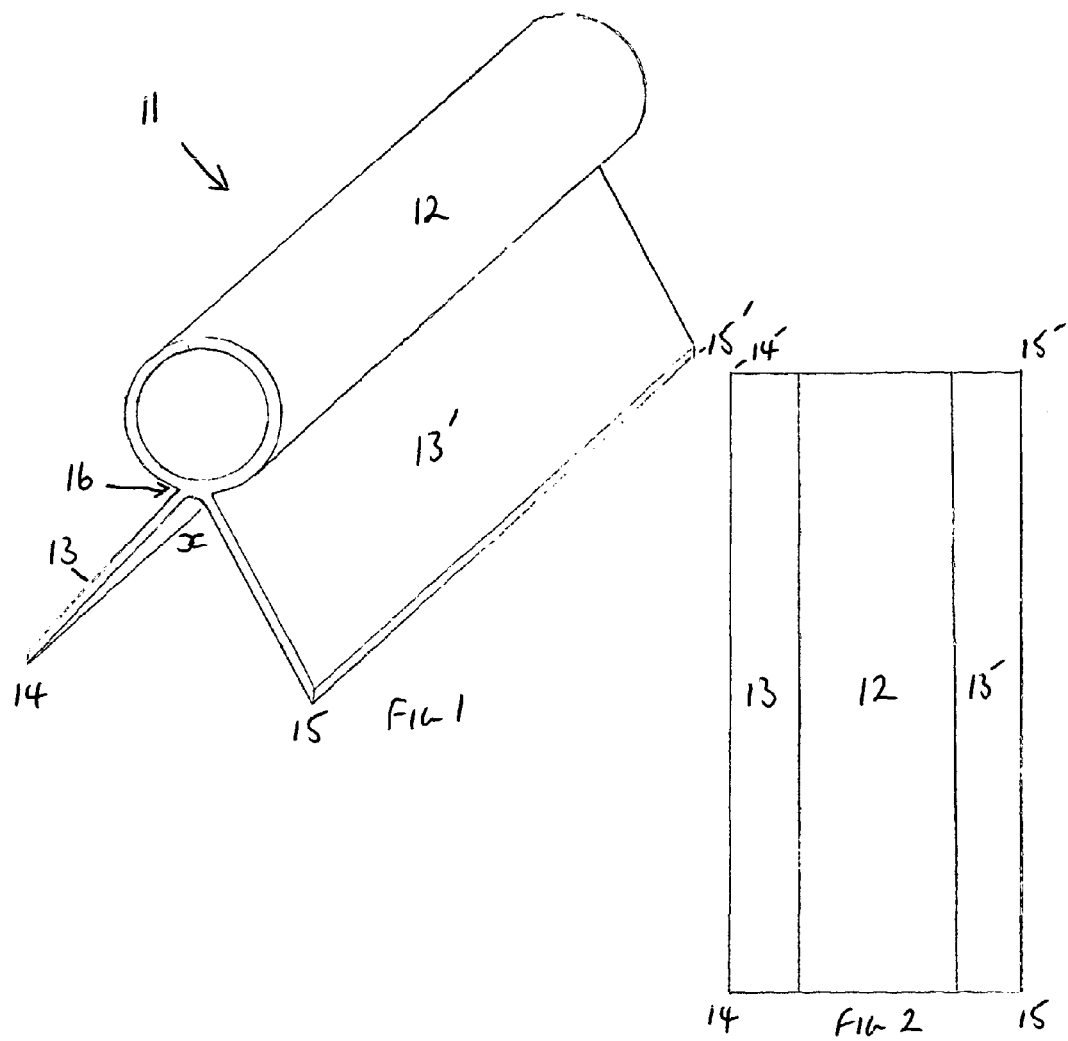
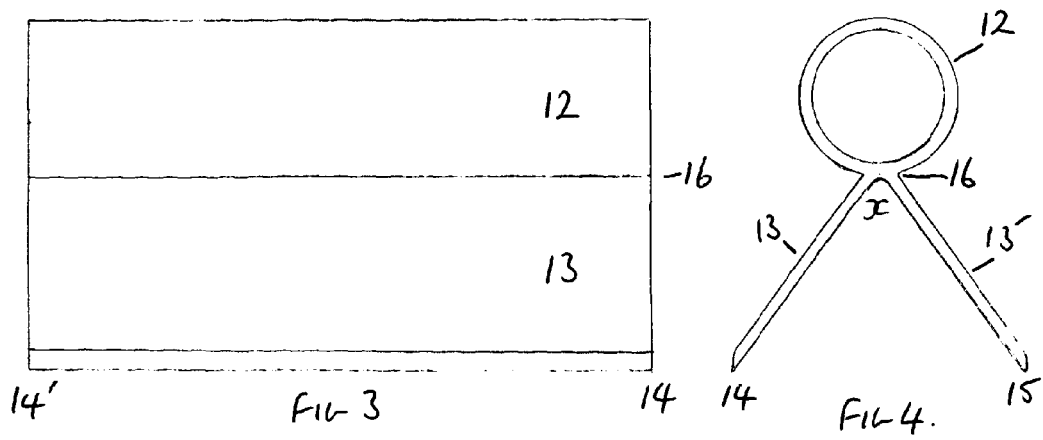

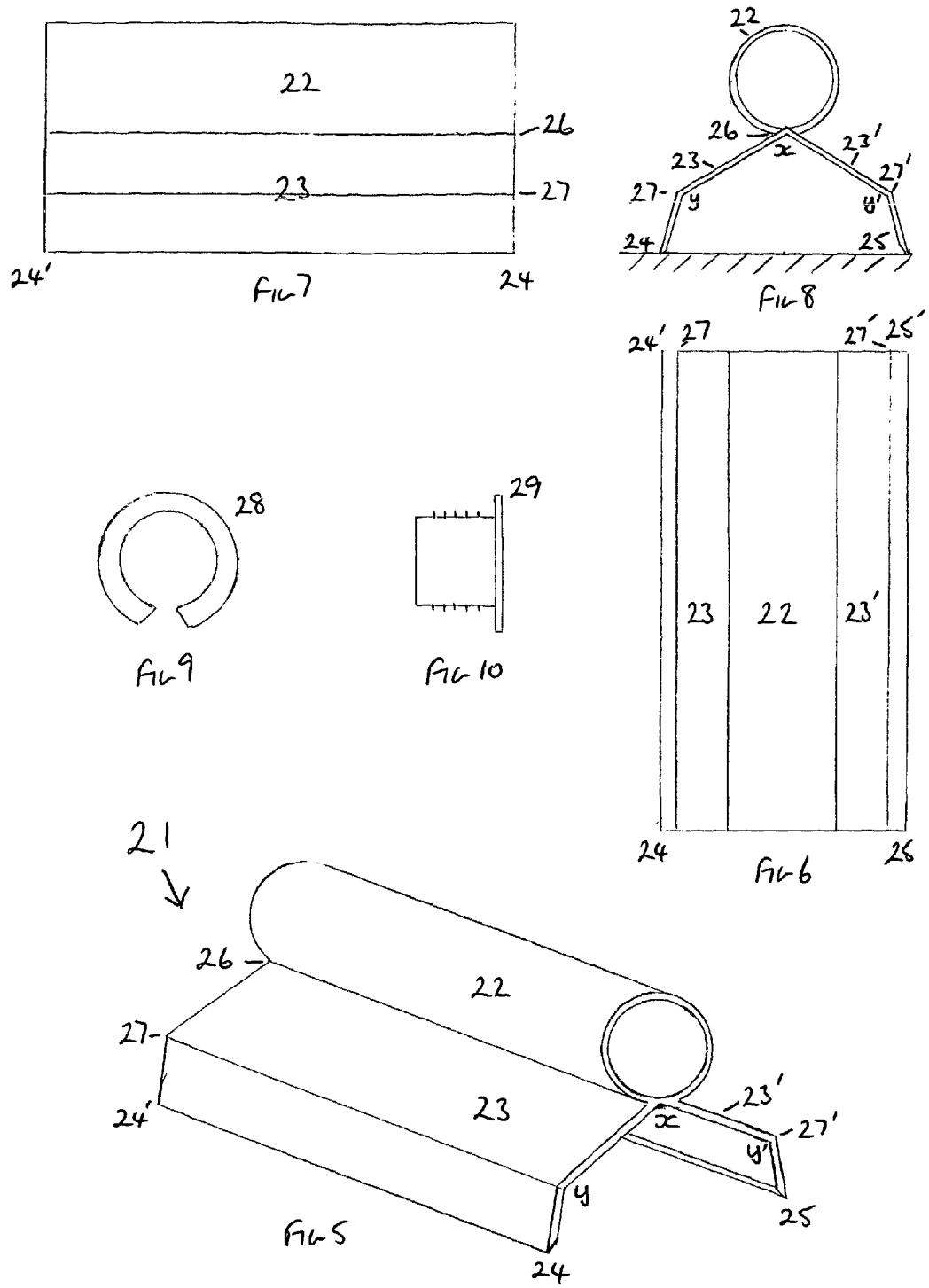

TWIN BLADED SCRAPER TOOL

BACKGROUND AND FIELD OF THE INVENTION

The invention relates to an apparatus for scraping substances from surfaces, and in particular to a novel and improved device for manually scraping ice, frost and snow from motor vehicle windscreens and windows. The invention is well suited for scraping frost build up from motor vehicle windscreens, but it is immediately appreciated that the invention finds beneficial use in nearly any application where it is desired to scrape a surface to remove a substance there from. Scraper devices typifying the present state of the art are disclosed in U.S. Pat. No. 4,275,476 to Hopkins et al., U.S. Pat. No. 3,130,436 to Krause, and U.S. Pat. No. 6,092,255 to Kim. The devices disclosed in the foregoing patents, and in the scrapers most frequently encountered in commercial use, generally consist of a handle section upon which is mounted a single scraping blade. The manual grip commonly used to grasp most scrapers is inefficient and does not allow the user to exert the pressure required to remove stubborn deposits from motor vehicle windscreens while simultaneously maintaining the scrapper at the correct angle to allow the blade to work efficiently. The result of this is usually having the scraper skid across the surface of the deposit or having to resort to two handed use for which the above mentioned scrapers are not designed. More recent devices which have overcome the issue of grip in the case of the above are disclosed in GB9802114 to Webber, U.S. Pat. No. 6,018,836 to Williams, U.S. Pat. No. 6,282,742 to Boggs, and U.S. Pat. No. 5,781,957 to Scholl. The devices disclosed in these patents have addressed the issue of grip and balance, by having a device which naturally sits on a surface, blades downwardly displaced, handle uppermost. However blade configurations on these devices do not lend themselves to effective removal of stubborn deposits either by having a single blade which encompasses the device requiring many passes for the blade to initially penetrate the substrate, or as illustrated in '836 to Williams by having smaller blades a greater distance apart and an opposing handle which does not allow the required grip and arm alignment to apply maximum pressure to the device and its blades. This results in more time and effort being expended to achieve the required clearance. The present invention addresses an unmet need for a scraper device which allows the user to apply maximum pressure to an efficient blade configuration, and maintain stability and blade cutting angle whilst being comfortable in use due to natural arm alignment.

SUMMARY OF THE INVENTION

The invention relates to a manually held and operated scraper for removing, for example, frost, snow, ice and the like from a motor vehicle windscreen.

An object of the invention is to provide a novel and improved scraper which is ergonomically improved to reduce unnatural stresses in the users hand during use.

Another object of the invention is to provide a scraper which permits the user to apply maximum pressure to the surface to be scraped without sacrificing control and with the minimum of grip.

Another object of the invention is to provide a more efficient scraper that permits the user to scrape a surface with the return stroke of the scraper as well as the forward stroke.

An advantage of the invention is that it reduces stress in the users hand and wrist to reduce fatigue.

Another advantage of the invention is that it permits the user to direct nearly all energy to the scraping action rather than wasting effort in maintaining stability of the device.

In accordance with the invention a robust one piece twin bladed scraper tool for scraping material from a surface comprises of a pair of opposing identical blades under a cylindrical in line handle, wherein the blades are arranged to form an open bottomed triangle with the blades diverging away from each other at an angle of less than 90 degrees.

The blades preferably diverge away from each other at an angle of greater than 60 degrees, creating a blade to surface angle of contact greater than 45 degrees but less than 60 degrees.

The blade and handle length may be more than two times the blades distance apart, at the point of contact with the surface to be scraped.

The handle may incorporate rubber ribs on its exterior surface as an aid to gripping.

An alternate embodiment is also provided for which objects and advantages are as above with the following additional objectives.

An object of the alternate embodiment is to provide an increased angle of contact of blade to surface to be scraped.

Another object of the alternate embodiment is to provide the option of a more comfortable handle.

Another object of the alternate embodiment is to provide a scraper with increased stability. In accordance with the alternate embodiment a twin bladed scraper tool for scraping material from a surface comprises of a pair of opposing identical dog-legged blades under a cylindrical in line handle, wherein the blades are arranged to form an open bottomed irregular pentagon with the blades diverging away from each other at an angle of less than 180 degrees.

The blades preferably diverge away from each other at an angle of greater than 70 degrees with an angle of return on the dog leg of greater than 92 degrees but less than 180 degrees, creating a blade to surface angle of contact greater than 45 degrees but less than 90 degrees. The blades and handle may be a single extrusion one piece tool or may have additional parts to provide a soft grip handle and/or harder blade tips.

The dimensions of the tool are such that generally where the blades meet the surface to be scraped, the distance between the blades is greater than the overall height of the tool.

DETAILED DESCRIPTION OF PREFERRED EMBODIMENT

The invention relates to scrapers and more particularly to scrapers for removing ice and snow from vehicle windows and windscreens. The scraper apparatus according to present invention offers a more comfortable, efficient and reliable means of manually scraping ice and snow from a motor vehicle windscreen. While the invention is most suitable for scraping ice and snow from windows, it is appreciated that the apparatus may have beneficial use in almost any instance where it is required to scrape a surface to remove a substrate there from.

With reference to FIG. 1-4 the apparatus of the invention comprises of a pair of opposing blades 13,13' diverging away from each other under a cylindrical handle 12 at an angle at x of between 60 and 90 degrees. The scraper 11 is fashioned from a durable plastic to give rigid blades in use but soft enough not to scratch glass. The scraper is likely to be extruded.

As best seen in FIGS. 1 and 4 the scraper 11, is fashioned in the shape of an open bottomed triangle with a cylindrical handle 12 to its top, at the furthest point from the blade edges 14 and 15 and the surface to be scraped. Accordingly a user of the invention may grasp the handle in various ways, depending on comfort and stroke and at all times avoid any contact with the surface to be scraped. FIGS. 1-3 show the handle 12 is the same length as the blades and both blades 13,13' are of a similar projection, typically 40-45 mm ensuring that pressure applied to the handle is distributed to the blades evenly.

The intersection at 16 provides the structural connection between the handle 12 and the blades 13,13'. The scraper blades 13,13' engage the surface to be scraped at an angle of between 45 and 60 degrees and are tapered along their lengths to form a chamfer 14,14' and 15,15' so that the edges of these blades form a downwardly directed sharp edge of less than 90 degrees to the surface to be scraped.

To practice the invention the user places the scraper 11 against the surface to be scraped. The scraper is positioned so that both blade edges 14 and 15 are in contact with the surface.

A choice of hand positions on the handle 12 are available, the handle may be placed directly under the knuckles with the thumb wrapped around the end of the handle, and the scraper used in a forward and back motion. The scraper can be held diagonally across the palm and be pushed diagonally away from the body, or the handle can be held in line with the arm and used in a side to side motion, this gives the user the choice of the most comfortable and effective hold. In use the only pressures that need be applied are a downward and sidewards pressure. No balancing or lifting pressure is required to make any compensation to correct the cutting angle. The relation of the blade angles 14 and 15 to each other and any curvature of the windscreen acts to increase the pressure applied to the screen by clearing a smaller area of the screen, this is then compensated by having the bi-directional function of the scraper. p On quarter lights where build up of substrates is generally less due to their vertical nature the scraper may be used with one blade only to ensure total clearance.

DETAILED DESCRIPTION OF ALTERNATE EMBODIMENT

FIGS. 5-10 show an alternate embodiment of the invention whereby the apparatus of the invention comprises of a pair of opposing dog-legged blades 23,23' diverging away from each other under a cylindrical handle 22 at an angle at x of between 72 degrees and 180 degrees. As best seen in FIGS. 5 and 8 the scraper 21, is fashioned in the shape of an open bottomed irregular pentagon with a cylindrical handle 22 to its top, at the furthest point from the blade edges 24 and 25 and the surface to be scraped. FIGS. 1-3 show the handle 22 is the same length as the blades and both blades 23,23' are of similar length, typically 130 mm or more depending on model. Both blades have an equal projection from their intersection 26 to the return angles 27,27' and similarly both lower sections from the return angles 27,27' will be of an equal length though not necessarily the same as the upper section. The return angles y,y' may vary between 92 degrees and 180 degrees but will be identical ensuring that pressure applied to the handle is distributed to the blades evenly. The intersection at 26 provides the structural connection between the handle 22 and the blades 23,23'. The scraper blades 23,23' engage the surface to be scraped at an angle of between 45 degrees and 90 degrees and are tapered along their lengths to form a chamfer so that the edges of these blades 24,24' and 25,25' form a downwardly directed sharp edge of less than 90 degrees to the surface to be scraped. The chamfers at the blade edges may be on either the external or internal face of the blade depending on the angle of contact with the surface to be scraped. The optional handle cover 28 is a wrap around soft grip handle and a plastic stopper 29 provides a finished end for the covered handle. To practice the alternate embodiment of the invention the procedure is as the preferred embodiment.

BRIEF DESCRIPTION OF THE DRAWINGS

FIG. 1 is a perspective view from above a preferred embodiment of the invention.

FIG. 2 is a top plan view of the embodiment of the invention shown in FIG. 1.

FIG. 3 is a side view in elevation of the embodiment of the invention shown in FIG. 1

FIG. 4 is an end view in elevation of the embodiment of the invention shown in FIG. 1

FIG. 5 is a perspective view from above an alternate embodiment of the invention FIG. 6 is a top plan view of the embodiment of the invention shown in FIG. 5

FIG. 7 is a side view in elevation of the embodiment of the invention shown in FIG. 5

FIG. 8 is an end view in elevation of the embodiment of the invention shown in FIG. 5

FIG. 9 is an end view of the optional handle cover.

FIG. 10 is a sectional view of the covered handle finishing stopper.

Note. Numbers which show common features are prefixed by 1 in FIGS. 1-4 and by 2 in FIGS. 5-10.

I claim:

1. A one piece twin bladed scraper tool for scraping material from a surface comprising:
    a pair of opposing scraping blades under a closed hollow cylindrical in-line handle;
    wherein the blades extend from a common structural connection located on the handle and diverge away from each other forming an open bottom and defining an angle at the apex; the angle is greater than 60 degrees but less than 180 degrees; the blades each define a contact edge substantially parallel to each other and to the handle; each of the contact edges extend from a first end of the respective blade to a second opposite end thereof that is to engage a surface; and the contact edge of each blade is linear from the first end to the second end thereof.

* * * * *